Figure 1:
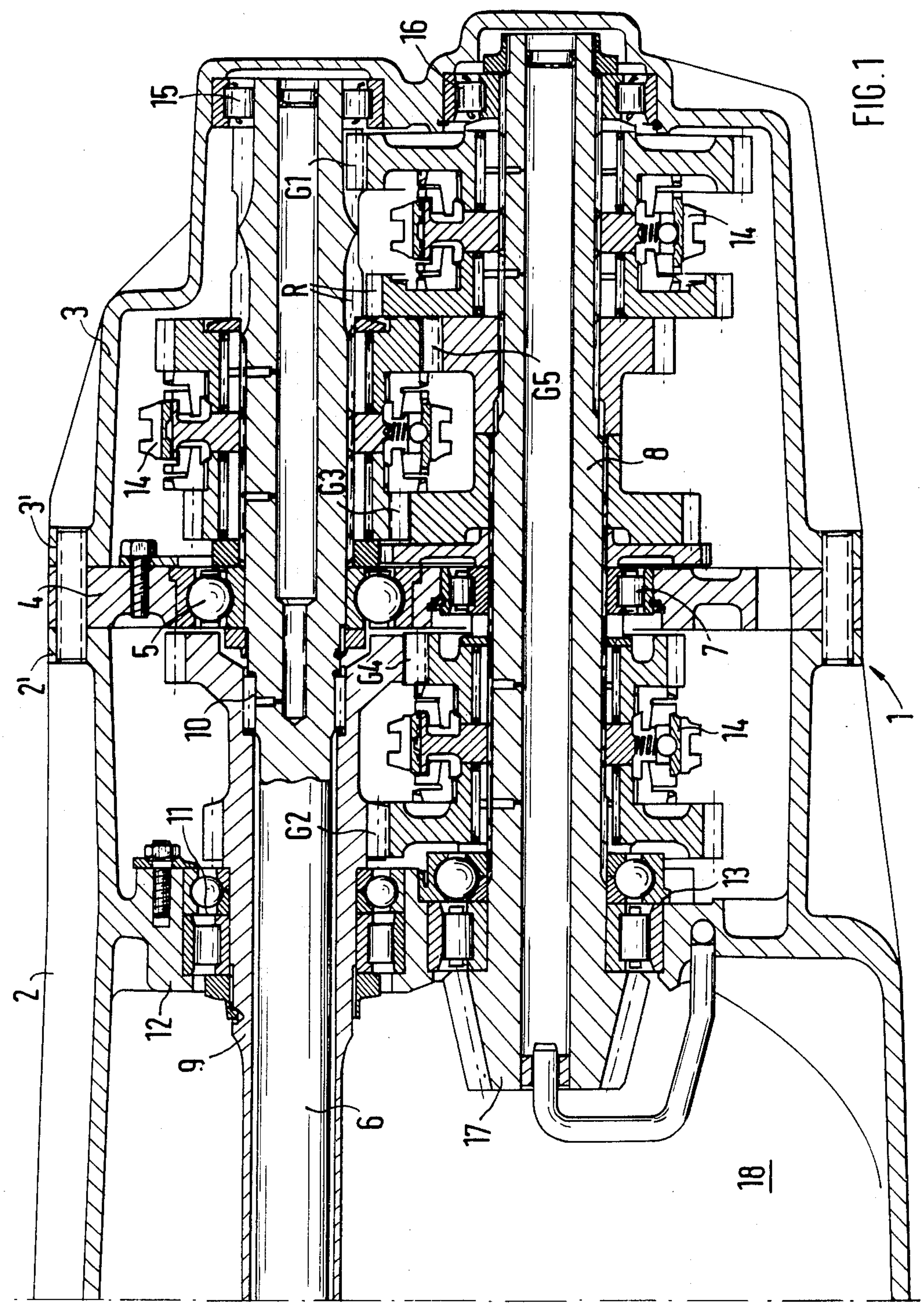

United States Patent [19]

Bardoll

[11] Patent Number: 4,771,648

[45] Date of Patent: Sep. 20, 1988

[54] CHANGE-SPEED TRANSMISSION FOR A MOTOR VEHICLE

[75] Inventor: Meinrad Bardoll, Weissach, Fed. Rep. of Germany

[73] Assignee: Dr. Ing h.c.F. Porsche Aktiengesellschaft, Fed. Rep. of Germany

[21] Appl. No.: 899,155

[22] Filed: Aug. 22, 1986

[30] Foreign Application Priority Data

Aug. 22, 1985 [DE] Fed. Rep. of Germany ....... 3530017

[51] Int. Cl.[4] ................ F16H 3/08

[52] U.S. Cl. ................ 74/359; 74/363; 74/375

[58] Field of Search ................ 74/330, 359, 360, 334, 74/340, 363, 375, 606 R

[56] References Cited

U.S. PATENT DOCUMENTS

| | | | |
|---|---|---|---|
| 1,705,032 | 3/1929 | Short | 74/330 |
| 2,099,141 | 11/1937 | Railton et al. | 74/330 X |
| 2,620,679 | 12/1952 | Issigonis et al. | 74/330 X |
| 3,078,673 | 2/1963 | Browning et al. | 74/364 X |
| 3,301,078 | 1/1967 | Micheal | 74/360 X |
| 3,733,912 | 5/1973 | Murayama et al. | 74/15.4 |
| 3,916,712 | 11/1975 | Kelbel et al. | 74/410 |
| 4,292,855 | 10/1981 | Murayama | 74/360 X |
| 4,296,644 | 10/1981 | Sada et al. | 74/606 R |
| 4,499,791 | 2/1985 | Brisabois | 74/606 R X |
| 4,509,381 | 4/1985 | Ikemoto et al. | 74/413 |
| 4,528,867 | 7/1985 | Semba et al. | 74/359 X |
| 4,610,177 | 9/1986 | Mahoney | 74/359 X |
| 4,628,768 | 12/1986 | Omura et al. | 74/360 X |
| 4,658,663 | 4/1987 | Hiraiwa | 74/330 X |

FOREIGN PATENT DOCUMENTS

| | | | |
|---|---|---|---|
| 76233 | 10/1981 | Australia . | |
| 0040864 | 12/1981 | European Pat. Off. . | |
| 2941062 | 5/1980 | Fed. Rep. of Germany . | |
| 0714883 | 11/1931 | France | 74/359 |
| 0799949 | 4/1936 | France | 74/359 |
| 1053632 | 10/1955 | France | 74/363 |
| 2180679 | 11/1973 | France . | |
| 2393986 | 1/1979 | France . | |
| 0084246 | 5/1983 | Japan | 74/363 |
| 2036208 | 11/1979 | United Kingdom . | |
| 2107805 | 5/1983 | United Kingdom | 74/330 |

OTHER PUBLICATIONS

German Article from VDI-Berichte No. 466, 1983, *Elektronische Regelung Eines* Poppelkupplungs-Getriebes.

*Primary Examiner*—Leslie A. Braun
*Assistant Examiner*—Dwight G. Diehl
*Attorney, Agent, or Firm*—Barnes & Thornburg

[57] ABSTRACT

A change-speed transmission for a motor vehicle which includes as input shafts a central shaft supported in an intermediate plate of the transmission housing and a hollow shaft supported on the central shaft near the intermediate plate. An output shaft for the axle drive is supported in the transmission housing parallelly to the input shafts. The transmission housing is constructed two-partite or three-partite whereby a separating plane extends within the area of the intermediate plate and parallel thereto. A first group of transmission speeds is coordinated to the central shaft and is located on one side of the intermediate plate, while a second group of transmission speeds coordinated to the hollow shaft is located on the other side of the intermediate plate.

12 Claims, 2 Drawing Sheets

SHIFTABLE CLUTCH

SHIFTABLE CLUTCH
1
2
2'
3
3'
4
5
6
7
8
9
10
11
12
13
14
15
16
17
18
19
21
22
G1
G2
G3
G4
G5
G6
R

CHANGE-SPEED TRANSMISSION FOR A MOTOR VEHICLE

The present invention relates to a change-speed transmission for a motor vehicle with a central shaft doubly supported in the transmission housing for the drive of a first group of speeds and a shorter hollow shaft supported on the central shaft for the drive of a second group of transmission speeds.

Such change-speed transmissions with two input shafts, a central shaft, and a hollow shaft supported on the central shaft are utilized primarily for double-clutch transmissions as are described in the "VDI-Berichte" (VDI Reports), No. 466, 1983, pages 101 to 108. The central shaft, by means of which the first, third and fifth gear are driven, is thereby connected with one clutch disk of a double-clutch whereas the hollow shaft for the drive of the second, fourth and reverse speed is connected with the other clutch disk. After actuation of a clutch disk, the associated group of transmission speeds is available for the drive. The transmission speeds consist each of a fixed gear and of a loose gear meshing with the fixed gear, of which one is arranged on one of the input shafts, and the other on the output shaft parallel thereto. For engaging a speed, the loose gear is nonrotatably connected in a conventional manner by means of a synchronizing clutch with the associated shaft. This type of transmission permits a shifting from one transmission speed of the one input shaft to a transmission speed of the other input shaft without the occurrence of tractive force interruption. However, the bearing support of the input shafts as well as the assembly of the gear sets is beset by problems, especially if a five-speed or six-speed transmission is to be selectively accommodated in the same transmission housing.

The object of the present invention resides in so coordinating the transmission speeds to the shaft and to so arrange the bearing places of the shafts that the bearing support thereof is assured with smallest possible shaft bending and simple assembly.

The underlying problems are solved according to the present invention in that the first group of transmission speeds is arranged on one side of an intermediate plate of the transmission housing and the second group of transmission speeds as well as an end bearing of the hollow shaft on the central shaft are arranged on the other side of the intermediate plate, whereby the intermediate plate contains a bearing of the central shaft and a bearing of the output shaft and whereby a separating plane of the transmission housing constructed two-partite or three-partite extends parallel thereto within the area of the intermediate plate.

The first group of transmission speeds is arranged in the transmission housing on one side of an intermediate plate and the second group of transmission speeds on the other side of the intermediate plate in which is also supported the central shaft. Consequently, the end bearing of the hollow shaft on the central shaft can be placed so close to the intermediate plate that the bearing force is supported over the shortest path and the shaft bending becomes very small.

This arrangement in accordance with the present invention makes it possible to realize, with a maximum number of identical parts, selectively a five-speed transmission of a six-speed transmission.

Figure 2:
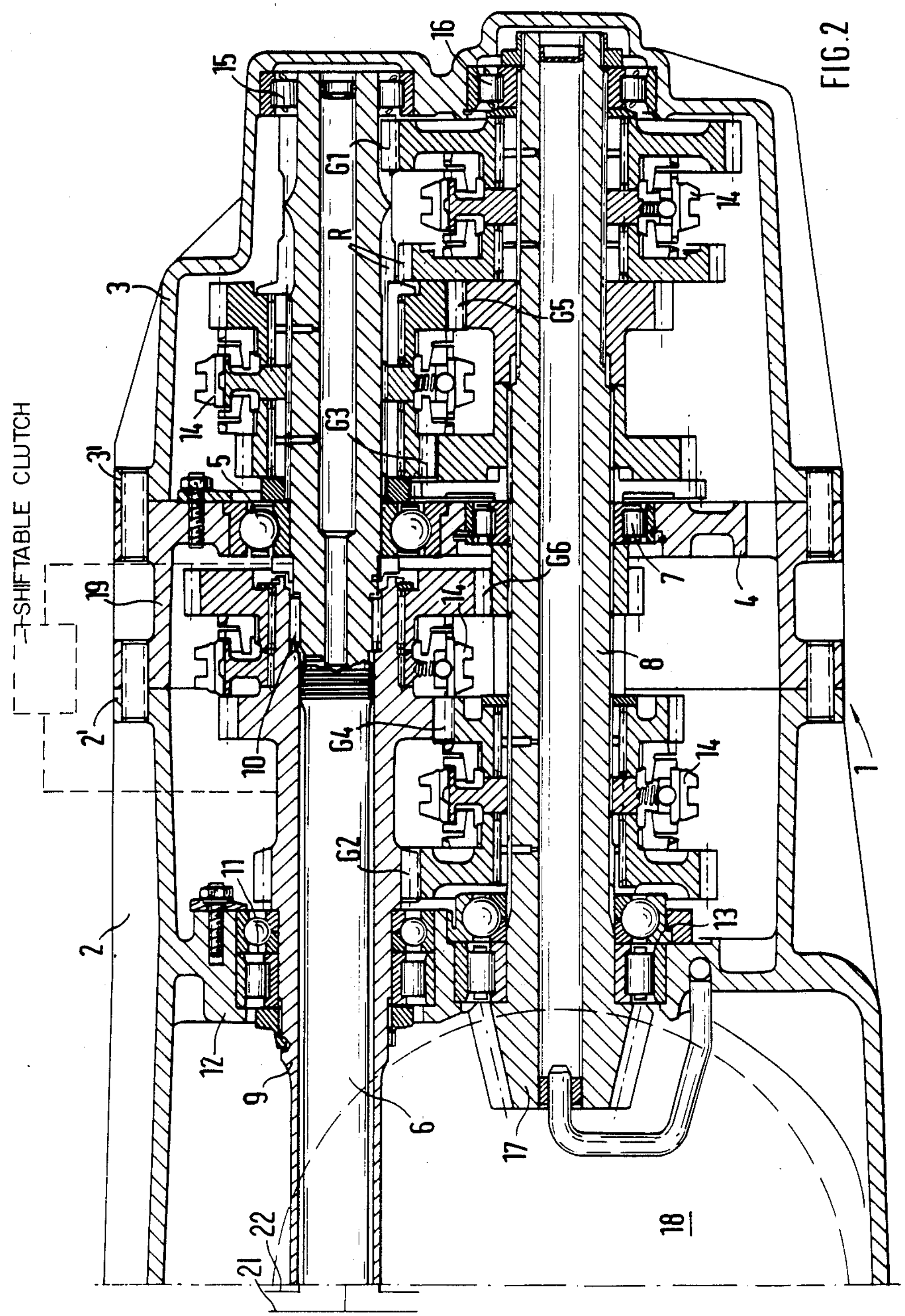

These and other objects, features and advantages of the present invention will become more apparent from the following description when taken in connection with the accompanying drawing which shows, for purposes of illustration only, two embodiments in accordance with the present invention, and wherein:

FIG. 1 is a longitudinal cross-sectional view through a five-speed transmission in accordance with the present invention; and FIG. 2 is a longitudinal cross-sectional view, similar to FIG. 1, illustrating the arrangement of a six-speed transmission in accordance with the present invention.

Referring now to the drawing wherein like reference numerals are used throughout the two views to designate like parts, the five-speed transmission according to FIG. 1 is surrounded by a transmission housing generally designated by reference numeral 1 which consists of an axle housing 2 and of a bell-shaped housing 3 flangedly connected at the axle housing 2, whereby an intermediate plate 4 is inserted between the two flanges 2' and 3'. The intermediate plate 4 contains a bearing 5 for a central shaft 6 as well as a bearing 7 for a parallelly disposed output shaft 8. A hollow shaft 9 is supported on the central shaft 6 whose end bearing 10 is arranged near the intermediate plate 4. The second bearing 11 of the hollow shaft 9 is seated in a bearing plate 12 which is cast integrally with the axle housing 2 and also contains a bearing 13 for the output shaft 8.

The gear pairs for the second transmission speed G2 and the fourth transmission speed G4 are located between the bearing plate 12 and the intermediate plate 4 whereby the fixed gears of these transmission speeds are milled into the hollow shaft 9 whereas the loose gears are supported on the output shaft 8 and are adapted to be connected therewith by means of a synchronizing clutch 14.

The gears for the third gear G3, the fifth gear G5, the reverse gear R and the first gear G1 are arranged in this sequence on the other side of the intermediate plate 4 and are surrounded by the bell-shaped housing 3 which contains in its bottom portion an end bearing 15 for the central shaft 6 and an end bearing 16 for the output shaft 8. The output shaft 8 is provided at the other end with a bevel gear 17 which engages in a spur bevel gear 18 and effects the axle drive. The loose gears of the third speed G3 and of the fifth speed G5 are supported on the central shaft 6, respectively, on a bearing bushing 20 nonrotatably connected therewith. The fixed gears of these transmission speeds are secured on a spline-tooth profile of the output shaft 8. The loose gears of the first speed G1 and of the reverse speed R are supported on the output shaft; the fixed gears of these transmission speeds are milled into the central shaft 6.

This group of transmission speeds remains unchanged if a six-speed transmission is made from the five speed transmission as is shown in FIG. 2. In that case, an intermediate housing 19 is threadably secured between the flanges 2' and 3' of the axle housing 2 and of the bell-shaped housing 3; the intermediate plate 4 is thereby cast integrally with the intermediate housing 19. The hollow shaft 9 and the output shaft 8 are extended in order to be able to accommodate near the intermediate plate 4 a sixth transmission speed G6 with a synchronizing clutch 14 whereby the loose gear of the transmission speed G6 is supported on the hollow shaft 9 and the fixed gear is nonrotatable on the output shaft 8.

In lieu of the sixth transmission speed, one could also arrange within this area a shiftable clutch, schematically shown in dashed lines, by means of which the central shaft 6 and the hollow shaft 9 are adapted to be nonrotatably connected with each other. When these two input shafts are rigidly coupled with each other, the two clutch disks 21, 22 connected therewith are available for a torque transmission which is of advantage for the starting and in the lower rotational speed range.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A six-speed change-speed transmission for a motor vehicle, comprising multi-partite transmission housing means, a central shaft doubly supported in the transmission housing means and driving a first group of transmission speeds, a shorter hollow shaft supported on the central shaft and driving a second group of transmission speeds, the central shaft and the hollow shaft being operable to be alternately driven, each transmission speed being formed of a fixed gear and of a loose gear and consisting of a gear arranged on one of the hollow shaft and central shaft and a gear meshing therewith arranged on an output shaft substantially parallel to the central shaft, an axle drive operatively connected to an end of the output shaft, the first group of transmission speeds being arranged on one side of an intermediate plate means and the second group of transmission speeds being arranged on the other side of the intermediate plate means, said intermediate plate means containing a bearing of one of the central shaft and the hollow shaft and a bearing of the output shaft, wherein the intermediate plate means is arranged within the area of and substantially parallel to a plane separating parts of said multi-partite transmission housing means, wherein the loose gears of the second, fourth, first and reverse speed are supported on the output shaft, the loose gear of the sixth speed on the hollow shaft, the loose gears of the third and fifth speed on the central shaft and wherein all loose gears are operable to be connected with their associated shafts by synchronizing clutch means.

2. A change-speed transmission according to claim 1, wherein the transmission housing means is constructed two-partite or three-partite.

3. A change-speed transmission according to claim 1, wherein the other bearing of the central shaft and an end bearing of the output shaft is accommodated in a bell-shaped housing part which surrounds the first group of transmission speeds and together with the intermediate plate means is flangedly connected to an axle housing part of the transmission housing means.

4. A change-speed transmission according to claim 3, wherein the intermediate plate means is cast integrally at an intermediate housing part which, together with the axle housing part flangedly connected thereto surrounds the second group of transmission speeds as well as the axle drive including a bevel gear and a crown bevel gear.

5. A change-speed transmission according to claim 4, wherein a bearing plate is cast integrally with the axle housing part of the transmission housing means, the bearing plate containing a second bearing for the hollow shaft and a third bearing for the output shaft.

6. A change-speed transmission according to claim 5, wherein the first group of transmission speeds consists of the third, fifth, reverse and first speed which are arranged in that sequence from the intermediate plate means on the central shaft.

7. A change-speed transmission according to claim 1, wherein the intermediate housing part and the axle housing part of the transmission housing means as well as the distance of the bearing plate to the intermediate plate means are so dimensioned that a six-speed or five-speed transmission is selectively insertable into the transmission housing means.

8. A change-speed transmission according to claim 1, wherein the intermediate plate means is cast integrally at an intermediate housing part which, together with an axle housing part flangedly connected thereto surrounds the second group of transmission speeds as well as the axle drive including a bevel gear and a crown bevel gear.

9. A change-speed transmission according to claim 1, wherein a bearing plate is cast integrally with an axle housing part of the transmission housing means, the bearing plate containing a second bearing for the hollow shaft and a third bearing for the output shaft.

10. A change-speed transmission according to claim 9, wherein the intermediate housing part and the axle housing part of the transmission housing means as well as the distance of the bearing plate to the intermediate plate means are so dimensioned that a six-speed or five-speed transmission is selectively insertable into the transmission housing means.

11. A change-speed transmission according to claim 10, wherein the intermedite plate means is cast integrally at an intermediate housing part which, together with the axle housing part flangedly connected thereto surrounds the second group of transmission speeds as well as the axle drive including a bevel gear and a crown bevel gear.

12. A change-speed transmission according to claim 1, wherein the first group of transmission speeds consists of the third, fifth, reverse and first speed which are arranged in that sequence from the intermediate plate means on the central shaft.

* * * * *